(12) United States Patent
Mayadunne et al.

(10) Patent No.: US 8,729,202 B2
(45) Date of Patent: *May 20, 2014

(54) BIOCOMPATIBLE POLYMER COMPOSITIONS FOR DUAL OR MULTI STAGED CURING

(75) Inventors: Roshan Tyrrel Anton Mayadunne, Wheelers Hill (AU); Raju Adhikari, Wheelers Hill (AU); Pathiraja Arachchillage Gunatillake, Mulgrave (AU)

(73) Assignee: Polynovo Biomaterials Pty Limited, Clayton, Victoria (AU)

( * ) Notice: Subject to any disclaimer, the term of this patent is extended or adjusted under 35 U.S.C. 154(b) by 477 days.

This patent is subject to a terminal disclaimer.

(21) Appl. No.: 11/070,217

(22) Filed: Mar. 3, 2005

(65) Prior Publication Data

US 2005/0197422 A1 Sep. 8, 2005

(30) Foreign Application Priority Data

Mar. 3, 2004 (AU) ................................ 2004901111

(51) Int. Cl.
*C08F 10/00* (2006.01)
(52) U.S. Cl.
USPC .............. 526/310; 526/318; 522/97; 523/105
(58) Field of Classification Search
USPC ..................................... 526/310, 318; 522/97
See application file for complete search history.

(56) References Cited

U.S. PATENT DOCUMENTS

| | | | |
|---|---|---|---|
| 3,007,899 A | 11/1961 | Urs | 528/76 |
| 3,247,282 A | 4/1966 | Englisch | 528/306 |
| 3,281,378 A | 10/1966 | Garber et al. | 260/2.5 |
| 3,360,546 A | 12/1967 | Wygant et al. | 560/191 |
| 4,035,274 A | 7/1977 | McGinniss | 522/9 |
| 4,192,827 A * | 3/1980 | Mueller et al. | 525/123 |
| 4,273,690 A * | 6/1981 | Walus | 525/7 |
| 4,284,506 A | 8/1981 | Tetenbaum et al. | 210/321.6 |
| 4,293,679 A | 10/1981 | Cogliano | 528/48 |
| 4,412,033 A | 10/1983 | LaBelle et al. | 524/590 |
| 4,424,252 A | 1/1984 | Nativi | 428/209 |
| 4,451,523 A | 5/1984 | Nativi et al. | 428/209 |
| 4,908,406 A | 3/1990 | Mulhaupt et al. | 525/64 |
| 4,935,480 A | 6/1990 | Zdrahala et al. | 528/28 |
| 5,041,516 A | 8/1991 | Frechet et al. | 528/44 |
| 5,109,077 A | 4/1992 | Wick | 525/467 |
| 5,276,068 A | 1/1994 | Waknine | 522/28 |
| 5,278,202 A * | 1/1994 | Dunn et al. | 523/113 |
| 5,304,584 A * | 4/1994 | Nunez et al. | 523/106 |
| 5,324,519 A * | 6/1994 | Dunn et al. | 424/426 |
| 5,410,016 A * | 4/1995 | Hubbell et al. | 528/354 |
| 5,429,826 A * | 7/1995 | Nair et al. | 424/501 |
| 5,578,662 A | 11/1996 | Bennett et al. | 524/54 |
| 5,674,921 A * | 10/1997 | Regula et al. | 522/97 |
| 5,733,950 A * | 3/1998 | Dunn et al. | 523/113 |
| 5,886,127 A | 3/1999 | Newkome et al. | 528/49 |
| 5,981,684 A | 11/1999 | Bruchmann et al. | 528/45 |
| 6,124,370 A | 9/2000 | Walton et al. | 521/143 |
| 6,150,438 A * | 11/2000 | Shiraishi et al. | 524/35 |
| 6,376,637 B1 | 4/2002 | Bruchmann et al. | 528/60 |
| 6,376,742 B1 | 4/2002 | Zdrahala et al. | 623/11.11 |
| 6,388,047 B1 * | 5/2002 | Won et al. | 528/354 |
| 6,506,816 B1 * | 1/2003 | Ario et al. | 523/116 |
| 6,534,128 B1 * | 3/2003 | Carlson et al. | 427/466 |
| 6,773,714 B2 * | 8/2004 | Dunn et al. | 424/426 |
| 6,800,672 B2 * | 10/2004 | Dang et al. | 523/113 |
| 2001/0005738 A1 | 6/2001 | Bruchmann et al. | 525/123 |
| 2002/0103347 A1 | 8/2002 | Isaka et al. | 530/413 |
| 2003/0032734 A1 | 2/2003 | Roby | |
| 2003/0114552 A1 * | 6/2003 | Schacht | 523/113 |
| 2003/0114553 A1 * | 6/2003 | Karim et al. | 523/115 |
| 2003/0153673 A1 | 8/2003 | Schwalm et al. | 524/589 |
| 2004/0097684 A1 | 5/2004 | Bruchmann et al. | 528/44 |
| 2005/0112203 A1 | 5/2005 | Shau et al. | 424/489 |
| 2006/0074208 A1 | 4/2006 | Laredo et al. | 526/279 |

FOREIGN PATENT DOCUMENTS

| | | |
|---|---|---|
| EP | 0837084 | 4/1998 |
| JP | 07-070296 | 3/1995 |
| WO | WO 9902168 | 1/1999 |
| WO | WO 00/12579 | 3/2000 |
| WO | WO 00/67813 | 11/2000 |
| WO | WO 02/09655 | 2/2002 |
| WO | WO 02/10247 | 2/2002 |
| WO | WO 02/10292 | 2/2002 |

(Continued)

OTHER PUBLICATIONS

English language abstract JP 07-070296 (Mar. 14, 1995).*
Final Office Action in U.S. Appl. No. 10/520,414, May 29, 2008.
Arroyo et al. Revista de Plasticos Modernos, 218:217-226, 1974.
Yoshida et al. Agricultural and Biological Chemistry 34(11):1668-1675.
Ogata et al., Biochemica et Biophysica Acta, 742:384-390, 1983.
STN Database, File Registry, Registry No. 57214-23-0.
STN Database, File CA, Accession No. AN 82:113308.

(Continued)

*Primary Examiner* — Margaret Moore
(74) *Attorney, Agent, or Firm* — Novak Druce Connolly Bove + Quigg LLP

(57) ABSTRACT

The present invention provides a biocompatible polymer composition for use in biomedical applications comprising a base molecule, a linker molecule and at least one initiator compound, said base molecule having at least two differing functionalities, and said linker molecule having a functionality reactive with at least one functionality of said base molecule, the first of said at least two functionalities of said base molecule enabling a first curing stage of said polymer composition by reaction with said linker molecule, and the second and any further functionality of said base molecule enabling second and further curing stages of said polymer composition, said first, second and any further curing stages being capable of activation simultaneously or independently of each other as required.

13 Claims, 3 Drawing Sheets

(56) References Cited

FOREIGN PATENT DOCUMENTS

| WO | WO 2004/065450 | 8/2004 |
| WO | WO 2005/089778 | 9/2005 |
| WO | WO 2006/010278 | 2/2006 |

OTHER PUBLICATIONS

Supplementary European Search Reported dated Mar. 24, 2011 for corresponding European Application No. 05706338.0.

* cited by examiner

BIOCOMPATIBLE POLYMER COMPOSITIONS FOR DUAL OR MULTI STAGED CURING

This application claims priority to Australian Patent Application No. 200490111, filed Mar. 3, 2004, under 35 U.S.C. 119 and 37 C.F.R. §1.55.

FIELD OF INVENTION

The present invention relates to biocompatible polymer compositions for use in biomedical applications that are capable of curing on demand in two or more stages which are of the same or different character, and which are carried out simultaneously, in tandem or step wise. The compositions may be biodegradable or biostable and as such can be used in biomedical applications such as tissue engineering, drug delivery, as bioadhesives in wound healing, as bone substitutes or scaffolds, as cements in dental and periodontal applications and as anti adhesive or protective barriers.

BACKGROUND

The nature and chemistry of synthetic polymers used in biomedical applications varies depending on the application. In general they need to have the advantage over other materials of being able to be fabricated into any shape, and the ability to be tailored as far as their mechanical properties are concerned to the application at hand. Such polymers can also be tailored to contain various functionalities allowing them to integrate into the environment in which they are to be placed. Some implantable polymers for example are biodegradable and degrade to fragments that can be easily resorbed through metabolic pathways that the body uses to cleanse itself of undesired by products.

Synthetic biomedical polymers can be broadly classified in to non-biodegradable and biodegradable polymers. Those that are non-biodegradable are widely used when a medical device needs to be in place indefinitely or until such time as it is decided that the device is no longer required and can be safely removed, i.e. in permanent fixation devices. These polymers need to be completely non-biodegradable or have minimal degradation properties in the environment in which they are placed, and are, for example, widely used in areas such as breast implants, in orthopaedic applications such as bone fixation devices and more recently, to replace important tissues such as heart valves.

Polysiloxanes, polyurethanes and or their copolymers are widely used in such applications.

A vast majority of biodegradable polymers studied belong to the polyester family. Among these poly($\alpha$-hydroxy acids) such as poly(glycolic acid), poly(lactic acid) and a range of their copolymers have historically comprised the bulk of published material on biodegradable polyesters and have a long history of use as synthetic biodegradable materials in a number of clinical applications. Among these applications, poly(glycolic acid), poly(lactic acid) and their copolymers, poly(p-dioxanone), and copolymers of trimethylene carbonate and glycolide have been the most widely used. Their major applications include resorbable sutures, drug delivery systems and orthopaedic fixation devices such as pins, rods and screws. Among the families of synthetic polymers, the polyesters have been attractive for use in these applications because of their ease of degradation by hydrolysis of their ester linkage, the fact that their degradation products are resorbed through metabolic pathways in some cases and their potential to be tailored in terms of their structure to alter degradation rates.

Almost all of these polymers, both biodegradable and biostable, are pre manufactured or pre-cured and moulded, prior to application. In a minority of cases two or many different reactive species are mixed together immediately prior to application, so that the user has a specified window of time before the polymer begins to set or cure and becomes unworkable. In bone fixation devices a two part mixture can be applied or injected to the specific site following mixing but before it cures to a hard substance that supports the defect. Other hybrid materials which are mixtures of inorganic substances such as ceramics and polymers have been extensively investigated for orthopaedic repair. These polymer systems again rely on the use of uncontrolled curing by mixing a two part system to obtain the final cured solid material. Although these have the advantage of prefabricated pore sizes and superior mechanical strength, they suffer from an inability to be shaped to the required geometry.

Polymer compositions that can cure by multiple curing methods and steps which are designed for applications such as surface coatings and adhesives are reported in the literature. However, such compositions are not suited for biomedical applications because of their highly complex nature arising from the presence of numerous compounds incorporated to meet various product requirements.

It is one object of this invention to provide multifunctional polymer compositions for use in biomedical applications, the curing process of which may be controlled to allow ease of use, and the design of which may be adjusted to suit the specific application. The polymers are desirably capable of incorporating biological components such as cells, growth factors and other components such as nano-particulate hydroxyapatite, calcium phosphate or other particles which maybe an adjunct in the application selected.

SUMMARY OF INVENTION

To this end there is provided a biocompatible polymer composition for use in biomedical applications comprising a base molecule, a linker molecule and at least one initiator compound, said base molecule having at least two differing functionalities, and said linker molecule having a functionality reactive with at least one of said functionalities of said base molecule, the first of said at least two functionalities of said base molecule enabling a first curing stage of said polymer composition by reaction with the functionality of said linker molecule, and the second and any further functionality of said base molecule enabling second and optionally further curing stages of said polymer composition, said first, second and any further curing stages being capable of activation simultaneously or independently of each other as required.

This invention also provides a biocompatible prepolymer composition for use in biomedical applications comprising the reaction product of a base molecule, a linker molecule and at least one initiator compound, said base molecule having at least two differing functionalities, and said linker molecule having a functionality reactive with at least one of said functionalities of said base molecule, said reaction product being the result of a first curing stage wherein the first of said at least two functionalities of said base molecule reacts with the functionality of said linker molecule to form said prepolymer composition.

Preferably the biocompatible prepolymer composition is flowable and injectable.

Throughout this specification the term "prepolymer" will be used to mean the polymer composition which is formed in a first stage of curing by combination of a base molecule and a linker molecule but which is yet to be further cured in a second or further curing stage.

This invention also provides a cured biocompatible polymeric end product for use in biomedical applications, comprising the reaction product of a base molecule, a linker molecule and at least one initiator compound, said base molecule having at least two differing functionalities, and said linker molecule having a functionality reactive with at least one of said functionalities of said base molecule, said end product being the result of a first curing stage wherein the first of said at least two functionalities of said base molecule reacts with the functionality of said linker molecule and a second further curing stage and optionally further curing stages wherein said initiator compound is activated to affect free radical polymerisation of at least said second functionality of said base molecule.

It has been found that the compositions according to the invention are particularly useful in applications where two or more independent and non-interfering curing methods are desired. For example, in bone and cartilage or tissue engineering applications, one mode of curing can be used to generate essential porosity in implants while the other can be used to cross link a free flowing injectable material upon delivery. Further, the first mode of curing might for example be used to increase the viscosity of the composition such that the material could be shaped or moulded to desired shapes and forms, and the second mode of curing might be used to fix the final shape. The compositions according to the invention may also be engineered to cure in the presence of selective functional groups, causing strong covalent bonding to the substrate, or cured to a hard, space filling material by cross linking either simultaneously and/or in tandem and/or step wise as required. The compositions have the option of being engineered to be biocompatible and biodegradable or biostable for permanent fixtures, cured on demand either in-vivo or in-vitro and in either aqueous or organic environments. They can be made flowable and hence may be injectable, enabling non invasive surgical repair applications. When water is present in the compositions, the end cured material is porous enabling the delivery of biological components such as cells or growth factors and supply of nutrients to support cell growth in tissue engineered products and therapies. Further, other components such as nano-particulate hydroxyapatite, calcium phosphate and other particles may be incorporated. It has been found that the compositions of the invention may be typically cured on demand to a hard, optionally porous material with 1-2 minutes of irradiation. The polymer compositions, prepolymer compositions and cured end products according to the invention thus also find application in dental and periodontal repair, in wound repair including use as a surgical adhesive, as an anti-adhesive barrier, as a protective barrier, for example in protection of ulcers and in the manufacture of scaffolds.

Preferably the base molecule and the linker molecule may each be, independently of the other, a single organic molecule, or alternatively an oligomer formed from two or more substrate monomers. When the base or linker molecule is oligomeric, it preferably has a molecular weight of less than 2000, more preferably less than 1000, and more preferably less than 500.

The compositions of the invention may also comprise a radical inhibitor to prevent premature polymerisation of a prepolymer composition (formed by a combination of the base and linker molecules) during storage, and/or a sensitizer or a promoter to assist in the activation of said second and/or further curing steps.

Still more preferably the compositions of the invention may also comprise dispersant or porogen such as for example, but not limited to water; biological components such as cells, growth factors; bioactive molecules including biopharmaceuticals and drugs or other components such as nano-particulate hydroxyapatite, calcium phosphate or other particles.

As a porogen, water is preferably present in the compositions of the invention in an amount of up to 40% of the total weight of the composition. Higher levels of water may be incorporated if an emulsifier is also present in the composition. In such instances water in an amount of up to 80% may be incorporated. Addition of an emulsifier may also help to control pore size and distribution. Any emulsifier could be used but emulsifiers such as block copolymers of polyethylene glycol and polypropylene glycol (Pluronic available from BASF), block copolymers of polysiloxane and polyethylene glycol are preferred for biomedical applications. Commercially available emulsifiers that may be suitable include Symperonic PEF127 and Symperonic PE L101 (Uniqema)

Throughout this specification the term "initiator compound" shall be taken to mean a molecule or mixture of molecules which when activated by an energy source, will result in free radical polymerization of said composition in a second and/or further curing step. The second and/or further curing step is preferably activated by means external of the composition such as, for example, irradiation by light of particular wavelength (photoinitiation), by thermal initiation, or by redox initiation with the result that free radical polymerization occurs so as to harden the polymer composition. The terms "dual cure", "multiple cure" and "cure on demand" are interchangeably used to indicate a polymer that may be cured in more than one stage and at the timing of the users choice by application of suitable initiator stimulus.

In photoinitiated polymerisations, a sensitizer may be added to increase the rate of initiation. Other organic additives may be incorporated to shift the wavelength at which polymerisation occurs. The sensitizer may be a separate molecule which is of a chemical nature to predispose said polymer composition to a second or subsequent curing step under certain environmental conditions. Thus throughout this specification, the term "sensitizer" shall be taken to mean any molecule which assists in the activation and increases the rate of photoinitiation of a second or subsequent curing step.

Similarly, in polymerisations initiated thermally, a promoter may be added to accelerate the rate of initiation and/or to initiate polymerisation at a desired temperature.

A catalyst may also be added to the compositions of the invention to assist in the curing processes. Surfactants may also be present to modify the characteristics of the resultant product.

There is also provided a use of a biocompatible polymer composition, a biocompatible prepolymer composition or a cured biocompatible polymeric end product according to the invention in the preparation of biomedical implants.

There is further provided a use of a biocompatible polymer composition, a biocompatible prepolymer composition or a cured biocompatible polymeric end product according to the invention in the preparation of a bioadhesive.

There is further provided a use of a biocompatible polymer composition, a biocompatible prepolymer composition or a cured biocompatible polymeric end product according to the invention in the preparation of dental or periodontal cement.

There is further provided a use of a biocompatible polymer composition, a biocompatible prepolymer composition or a cured biocompatible polymeric end product according to the invention in the preparation of a dry delivery vehicle.

There is further provided a use of a biocompatible polymer composition according to the invention in the preparation of an aqueous emulsion for the delivery of cells, growth factors and bioactive molecules including biopharmaceuticals and drugs.

Throughout this specification the terms "comprises" or "comprising" or grammatical variations thereon shall be taken to specify the presence of stated features, integers, steps or components but does not preclude the presence or addition of one or more other features, integers, steps, components or groups thereof not specifically mentioned.

DETAILED DESCRIPTION OF THE INVENTION

In the compositions according to the invention the base molecule and linker molecule are preferably the two major components by mass and may, in general, either or both be a single organic compound or an oligomer of appropriately low molecular weight which when mixed and/or reacted produce a prepolymer composition that is able to be shaped and is preferably injectable in to the area of application and is not rendered solid until such time as a second or further curing step is activated by an external method. The base and linker molecules desirably each may possess at least one functional group that is able to bond to a functional group of the other molecule, preferably using an ionic bond, and more preferably a covalent bond that has sufficient bonding characteristics as to maintain the composition in the desired physical form in the environment in which it is placed until such time as a second or further curing step is affected. Similarly, the initiator, sensitizer and promoter molecule may contain such functional groups. However, it is not essential that the initiator, sensitizer or promoter molecules have such properties for the compositions to have cure on demand characteristics.

A preferred general structure of the base molecule is represented by the general formulae I or II where formula II shows a dendritic structure.

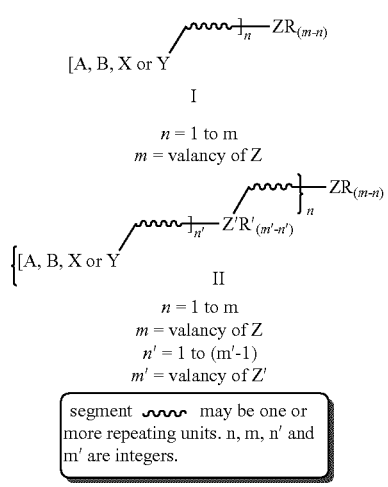

$n = 1$ to $m$
$m$ = valancy of Z

I $n = 1$ to $m$
$m$ = valancy of Z
$n' = 1$ to $(m'-1)$
$m'$ = valancy of Z'

II segment ∿∿∿ may be one or more repeating units. n, m, n' and m' are integers.

In the base molecule designated by formula I, Z may be H, C, O, N, Si, S. The remaining variables may then be defined according to the following table:

TABLE 1

| Atom (Z) | Valancy (m) | n (arms) | R | $ZR_{(m-n)}$ |
|---|---|---|---|---|
| C | 4 | 1 | H, CH$_3$, C$_2$H$_5$ or OR | CH$_3$, C(CH$_3$)$_3$, C(C$_2$H$_5$)$_3$, C(OR)$_3$ |
|  |  | 2 | H, CH$_3$, C$_2$H$_5$ or OR | CH$_2$, C(CH$_3$)$_2$, C(C$_2$H$_5$)$_2$, C(OR)$_2$ |
|  |  | 3 | H, CH$_3$, C$_2$H$_5$ or OR | CH, C(CH$_3$), C(C$_2$H$_5$), C(OR) |
|  |  | 4 | none | C (4 arms) |
| O | 2 | 1 | H, CH$_3$, C$_2$H$_5$ or OR | OH, O(CH$_3$), O(C$_2$H$_5$), R cannot be OR |
|  |  | 2 | none | O |
| Si | 4 | 1 | H, CH$_3$, C$_2$H$_5$ or OR | SiH$_3$, Si(CH$_3$)$_3$, Si(C$_2$H$_5$)$_3$, Si(OR)$_3$ |
|  |  | 2 | H, CH$_3$, C$_2$H$_5$ or OR | SiH$_2$, Si(CH$_3$)$_2$, Si(C$_2$H$_5$)$_2$, Si(OR)$_2$ |
|  |  | 3 | H, CH$_3$, C$_2$H$_5$ or OR | SiH, Si(CH$_3$), Si(C$_2$H$_5$), Si(OR) |
|  |  | 4 | none | Si (4 arms) |
| H | 1 | 1 | none | H (R = 0) |

In the base molecule designated by formula II, Z' may be H, C, O, N, Si, S. The remaining variables are as defined in Table 1 and in the following Table:

TABLE 2

| Atom (Z') | Valancy (m') | n' (arms) | R' | $Z'R'_{(m'-n')}$ |
|---|---|---|---|---|
| C | 4 | 1 | H, CH$_3$, C$_2$H$_5$ or OR | CH$_2$, C(CH$_3$)$_2$, C(C$_2$H$_5$)$_2$, C(OR)$_2$ |
|  |  | 2 | H, CH$_3$, C$_2$H$_5$ or OR | CH, C(CH$_3$), C(C$_2$H$_5$), C(OR) |
|  |  | 3 | none | C (4 arms) |
| O | 2 | 1 | none | O |
| Si | 4 | 1 | H, CH$_3$, C$_2$H$_5$ or OR | SiH$_2$, Si(CH$_3$)$_2$, Si(C$_2$H$_5$)$_2$, Si(OR)$_2$ |
|  |  | 2 | H, CH$_3$, C$_2$H$_5$ or OR | SiH, Si(CH$_3$), Si(C$_2$H$_5$), Si(OR) |
|  |  | 3 | none | Si (4 arms) |
| H | 1 | 0 | cannot have a group or atom |  |

Functional groups A and B may be unsaturated moieties that are independently radically polymerizable depending on the method and type of initiator used. Functional group A is preferably different to that of B in the way it may be triggered to polymerize. Functional group A for example may be an acrylate double bond which can be initiated to propagate polymerization by photolytic initiators and/or thermal initiators. Functional group B may for example, be an allyl moiety which can only be initiated under specific free radical initiating conditions, but not by photochemical means. Alternatively the functional group B may only be triggered to polymerise by a different combination of initiators.

The functional group B may not be an ethylenically unsaturated moiety. However, It may be any other organic moiety that can be triggered to initiate polymerization of unsaturated double bonds.

A linker molecule is a single organic molecule or alternatively an oligomer formed from two or more substrate molecules. The functional groups in the linker molecule may be chosen depending on the X or Y functional groups in the base molecule so as to be reactive therewith. For example, if the base molecule is isocyanato ethylmethacrylate, then the linker molecule can be any polyol or polyamine. Examples include di or higher hydroxy or amine functional oligomers based on polyesters, polycarbonates, polyethers, polysiloxanes etc. Similarly, if the X or Y functional group in the base molecule is hydroxy or amine, then the linker molecule may be designed to have isocyanate functional groups by reacting said polyols with a diisocyanate.

A typical reaction scheme between a base and a linker molecule is thus as follows:

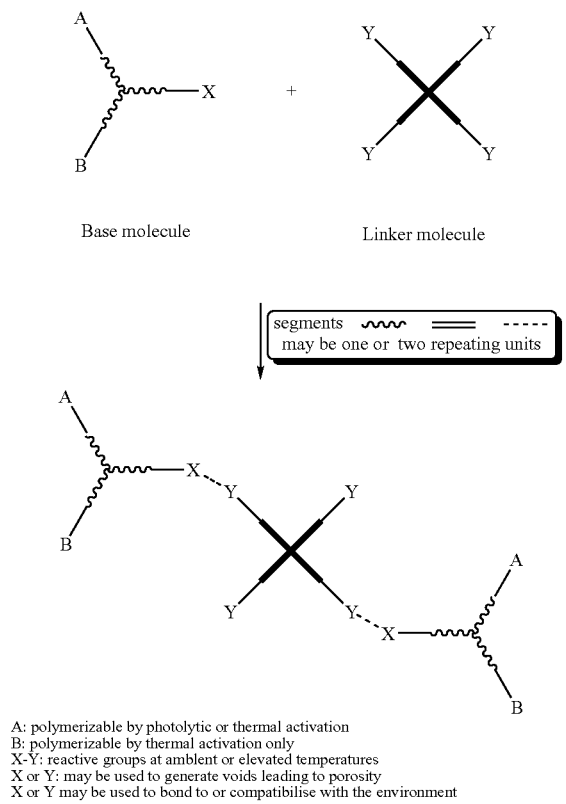

A: polymerizable by photolytic or thermal activation
B: polymerizable by thermal activation only
X-Y: reactive groups at ambient or elevated temperatures
X or Y: may be used to generate voids leading to porosity
X or Y may be used to bond to or compatibilise with the environment In the above reaction scheme, the base molecule contains A, B and X functional groups, examples of which are acrylic, allylic and hydroxyl groups, respectively. The linker molecule contains functional group Y, examples of which are isocyanate and thioisocyanate. The base and linker molecules are covalently linked via the reaction of X and Y functional groups.

The functional group X (or Y) in the base molecule or the linker molecule may be used for a number of purposes. Firstly, it may be used to bond, either by covalent or ionic means, to the linker. For example, X (or Y) may be hydroxy, isocyanate, carboxy, halo or any other suitable functional group. In such cases the functional group Y (or X) in the linker respectively may be isocyanate, hydroxy or mercapto, halo, carboxy or any other suitable functionality. More particularly, it is desirable to have groups that are highly reactive with each other, such as isocyanate with hydroxyl, amino or thiol functionalities, so as to achieve consistency of the prepolymer composition before application to the environment of use. Secondly, the functional group may be used to enhance integration with the surrounding environment, by skilfully manipulating the mass of residual functionality following the reaction. For example, when X is hydroxy, the remaining groups can promote mixing and enhance greater integration with aqueous surroundings or water as a component in the composition, through hydrogen bonding. Thus there is scope for the number of residual groups present to be varied depending on the application. Thirdly, the group X may be used to generate porosity if desired. For example isocyanate on reaction with water produces carbon dioxide, which may be used as a blowing agent to create voids and/or channel in the polymer immediately prior to curing to obtain a porous polymer where necessary.

The base and linker molecules can be either premixed to afford a one component curable prepolymer system or formulated immediately prior to the application.

The architecture of the prepolymer formed by polymerisation in a first stage of said base and linker molecules may be linear or regularly branched such as for example a star polymer or dendritic or may be irregularly branched such as for example, hyperbranched.

The catalyst may be selected from, but is not limited to tin catalysts such as stannous (II) ethylhexanoate, stannous oleate, stannous chloride, dibutyltin dilaurate (DBTDL), dibutyltin dioxide, dibutyltin di-2-ethylhexanoate; tertiary amine catalysts such as triethylene diamine, tetramethylbutanediamine (TMBDA), dimethylethanolamine, 1,8-diazabicyclo[5.4.0]undec-7-ene, 1,4-diazo[2,2,2]bicycle-octane (DABCO), hydroxy guanine, tetramethyl guanidine, N-ethylmorpholine, riboflavin; titanium catalysts such as titanium ethanol amine, Tyzor-titanate (Tyzor 131), Tyzor organotitanates, titanium butoxide; titanium aqueous chelates which are stable in water such as Tyzor-LA (aqueous titanium lactate chelate), Tyzor 131 (aqueous titanium chelate), Tyzor 217 (aqueous zirconium lactate), Tyzor 218 (aqueous zirconium glycolate); and other catalysts such as calcium phosphate, ovalbumin, sodium acetate, and tributyl phosphine.

The selection of the initiator present in the composition for the purpose of triggering free radical curing, is dependant on the method of initiation selected. Initiation may be thermal, photolytic or based on a redox system of components and is preferably by an external source. For example, camphorquinone, phosphine oxide based initiators such as 2,4,6-trimethyl benzoyl) diphenyl phosphine oxide are suitable and redox initiators such as ammonium persulfate and sodium metabisulfite are also suitable. For in-vivo applications photolytic initiators or redox based systems are preferred. More preferable is a system that cures the polymeric composition using a wave length that is either in the UV or visible region of electromagnetic radiation. Of the two, visible light initiation is more desirable in biomedical applications. In one embodiment of the invention, visible light source having a maximum wave length of 450±30 nm is used. Examples of photoinitiators include but are not limited to 2,2-dimethoxy-2-phenylacetophenone (Irgacure 651), Hydroxyalkyl phenones (1-hydroxycyclohexyl phenyl ketone (Irgacure 184), 2-methyl-1-[4-(methylthio)phenyl]-2-(4-morpholinyl)-1-propanone (Irgacure 907), 2-hydroxy-1-[4-(hydroxyethoxy) phenyl]-2-methyl-1-propanone (Darocur 2959), Darocur 4265, Darocur TPO, Darocur 1173, Irgacure 500, 784, 907, 2959, 819, 2020, 1000, 369, 651, 1300, 819/819W, Irgacure 2005 and Irgacure 2010W and Irgacure 2020, polysilanes, Esacure KP150 (Hydroxyalkylphenylketone), Camphorquinone, Rosebengal, ethyl-4-N,N-dimethylaminobenzoate(4EDMAB)/triethanolamine, α alkoxydeoxybenzoins, α,α-dialkoxyacetophenone (DEAP), (1-hydroxy-cyclohexylphenylketone), dibenzoyl disulphide, S-phenyl thiobenzoates, acylphosphine oxide, dibenzoylmethanes, O-acyl α-oximinoketones, phenylazo-4-diphenyl sulphone, benzophenones, flourenones, xanthones, thioxanthones, benzils, ketals (2,2-dimethoxy-2-phenylacetophenone DMP), α-ketocoumarines, anthraquinone, and terephthalophenones.

2,6-di-tert-butyl-4-methylphenol may be included in the composition as a radical inhibitor, and helps to avoid premature second stage polymerisation during storage of the prepolymer composition.

Dispersants, such as water, may be used in the composition and with the aim of generating or tailoring the desired physical properties of the resultant cured polymer during the curing process. For example, use of water as a dispersant in a composition that contains residual isocyanate groups will generate carbon dioxide during curing while the other mechanism of curing cross links the material into a hard material. Such dual mode curing enables the generation of voids and/or channels within the polymer enabling the fabrication of a porous polymer. Such porous polymeric materials with entrapped water or nutrient media are useful in in-vivo biomedical applications. Alternatively dispersants that do not generate carbon dioxide can be added if porosity is undesirable.

Sensitizers may include but are not limited to bis-(N,N'-tetraethyl) ethylene diamine, N,N-dimethyl amino ethyl methacrylate, Ethyl-4-dimethylaminobenzoate, Isopropyl thioxanthone (Quantacure ITX), Ethyl-p-diaminobenzoate, Triethanolamine, Tertiary amine (N,N-diethylaminomethacrylate), and Michler's ketone.

Variation of each component in the composition may be used to dictate the chemical and physical characteristics of the final cured polymer composition. For example, lowering the percentage of acrylate groups has the benefit of tailoring the final material to be softer while an increase makes it otherwise. This may be achieved by adding compounds incorporating acrylate groups in excess in the preparation of the prepolymer. Thus, the desired mechanical properties of the materials can be tailored to the application at hand. Increasing the quantity of dispersant changes the viscosity of the compositions which may have the effect of conforming the composition to the application at hand.

Preferred compositions are those in which the ratio of NCO:acrylate functionalities is in the range of 1.0-3.0:0.5-3.0.

Variation of the initiator concentrations may control the time frame in which the polymer can be cured into a soft or a hard material and also has an effect on the curing mechanisms. For example, fast curing (with high concentration of initiator) limits the swelling of the polymer composition during the generation of the porosity by carbon dioxide evolution in a dual mode isocyanate/water curing and radical cross linking system.

The compositions of the invention may be engineered to cure in either as aqueous or an organic environment and to have an injectable viscosity or to be formed as an in vitro or in vivo solid to suit the application at hand.

In one embodiment disclosed, the base molecule is monomeric or oligomeric, and may be cured upon incorporation into the prepolymer by free radical polymerization. It may possess one or many isocyanate reactive functional groups, such as but not limited to amino, hydroxyl and thiol and suitably activated double bond groups. More preferably, a monomeric base molecule possessing one or more free radically polymerizable acrylate functional groups and one hydroxy group reactive towards isocyanates, such as glycerol dimethylacrylate is used.

In an alternative embodiment disclosed, the base molecule is monomeric or oligomeric and contains acrylate and isocyanate functionalities. For example, the base molecule isocyanatoethylmethacrylate (IEM) is reacted with a linker molecule having hydroxy or amine functional groups to produce a prepolymer composition which may be cured in a second stage. In one preferred embodiment the composition preferably comprises a base molecule which is a polyurethane/urea structure which is more preferably the reaction product of a core molecule with two or more functional groups, either linear or multi arm such as but not limited to degradable polyesters, and an organic molecule containing isocyanate groups, more preferably a diisocyanate. The linker molecule is then reacted with the base molecule such that the resulting prepolymer contains terminal isocyanate end groups as well as free radically polymerizable olefinic groups such as acrylates so as to engineer the chemical and physical characteristics of the desired material.

The prepolymer compositions that are preferred for preparing biocompatible and biodegradable cured end products are based on degradable polyesters, such as polycaprolactone diol, triol, poly(lactic acid) diol, triol, poly(glycolic acid) diol triol, and copolymer diols and triols of lactic and glycolic acids. A range of architectures of these polyols are commercially available and vary from linear, branched to star type and their suitability to a particular application is solely depended on the requirements of the application at hand. Other polyols could be synthesized based on literature reported procedures.

For biocompatible and biostable compositions, preferred oligomers for use as linker molecules are prepared by reacting polyether polyols, polysiloxane polyols, hydrocarbon polyols or mixtures there of with diisocyanates such as 4,4-methylene diphenyl diisocyanate (MDI). Examples of polyether polyols include poly(teramethylene oxide), poly(hexamethylene oxide), poly(octamehylene oxide), and poly(decamethylene oxide). Siloxane based macrodiols such as α,ω-bis(6-hydroxy-ethoxypropyl)-polydimethylsiloxane (available from Shin-Etsu, Japan) are particularly preferred for biocompatible and biostable materials.

Preferred polymer compositions are those based on combinations of one or more of polycaprolactone diol (400-2000), polycaprolactone triol, poly(lactic acid) diol, polytetraemthylene ether glycol, glycerol with one or more of ethyl 2,6-diisocyanato hexanoate (ethyl lysinediisocyanate), 4,4-methylene bis(phenyl isocyanate), methy 2,6-diisocyanato hexanoate (methyl lysinediisocyanate), hexane diisocyanate, butane diisocyanate. The olefinic functionality is introduced by the use of one or more of isocyanato methacrylate, polyethylene glycol acrylate, glycerol dimethacrylate or isocyanato ethyl methacrylate.

Particularly suited linker molecules may be prepared by reacting di- or higher-hydroxy or amine functional oligomers based on polyesters, polycarbonates, polyethers, polysiloxanes etc with a diisocyanate or polyisocyanate. For biodegradable polymer compositions, polyester polyols (α-hydroxy acid-based) are preferred, whereas for biostable polymer compositions polysiloxane, polycarbonate and polyether based polyols are preferred.

Particularly suited base molecules may be selected from the group consisting of, but not limited to the following:

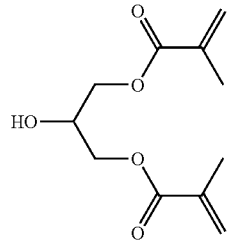

Glycerol dimethacrylate

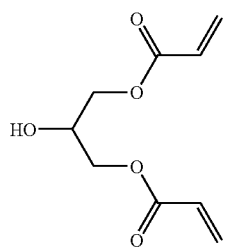
Glycerol diacrylate
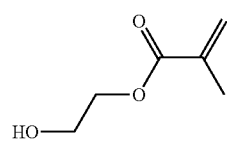
Hydroxy ethylmethacrylate
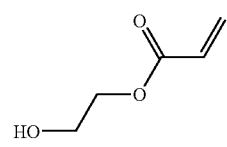
Hydroxy ethylacrylate
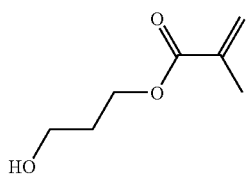
Hydroxy propylmethacrylate
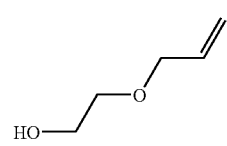
2-Allyloxyethanol
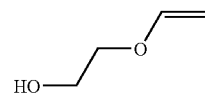
Ethylene glycol vinyl ether
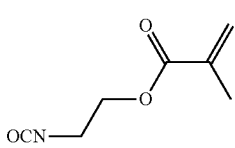
Isocyanato ethyl methacrylate
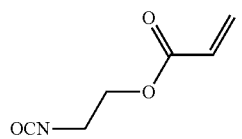
Isocyanato ethyl acrylate
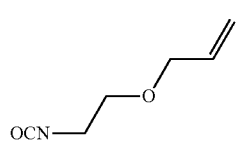
Isocyanato ethyl allyl ether
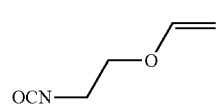
isocyanato ethyl vinyl ether
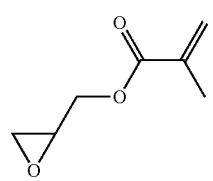
Glycidyl methacrylate
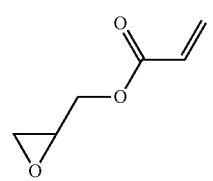
Glycidyl acrylate
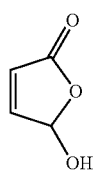
5-hydroxy-2(5H)-furanone
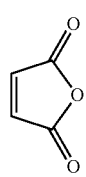
Maleic anhydride -continued

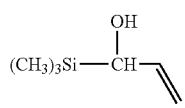

(1-Hydroxyallyl)trimethylsilane

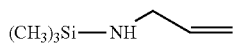

Allylaminotrimethylsilane

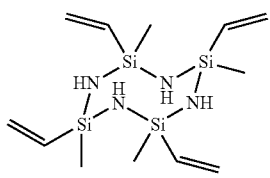

1, 3, 5, 7-Tetravinyl 1, 1, 3, 5, 7-tetramethylcyclotetrasilazane

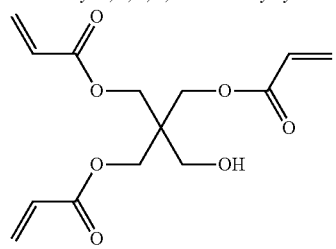

Pentaerythritol triacrylate

Other preferred embodiments are illustrated below. The following discussion is meant by way of example only and should not be considered to limit the invention to the architectures, functional groups or the ways in which the components are bonded and cured which are set out.

In one preferred embodiment the linker molecule may be formed from ethyl lysine diisocyanate and poly(caprolactone diol).

ethyl lysine diisocyanate (ELDI)

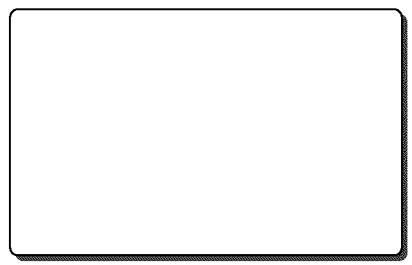

poly(caprolactone diol)

The polymer composition cures in a first stage as set out hereinbelow:

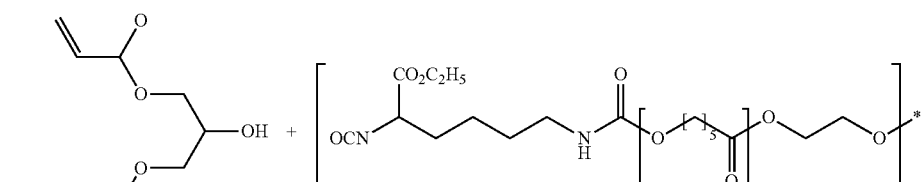

base molecule      linker molecule

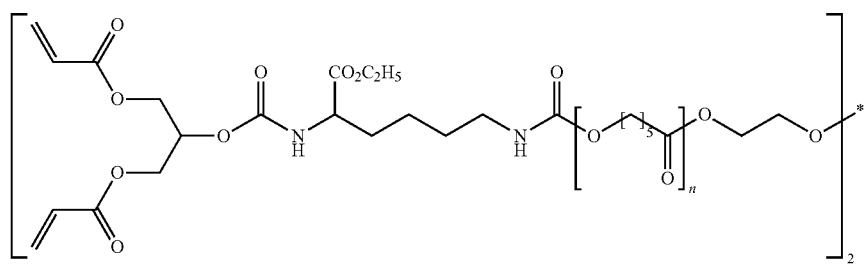

The base molecule in this example is commercially available glycerol dimethacrylate which is used to end cap the linker molecule. The linker is easily prepared by mixing appropriate ratios of a polycaprolactone diol of molecular weight approximately 400, and ethyl lysine diisocyanate, the ratios being selected to determine the properties required for the end product. The hydrophilicity of the end product can be adjusted depending on the desired application by varying the ratio of the acrylate and the polyol. A catalyst in this case is not essential, however, the presence of stannous octoate increases the rate of reaction between the isocyanate and the hydroxyl group. The composition is flowable, injectable through an 18 gauge needle, and can be cured with monochromatic visible light in the presence of suitable radical initiators.

An alternative preferred embodiment is based on a base molecule made from glycerol dimethacrylate and ethyl lysine diisocyanate with the linker being a polyol.

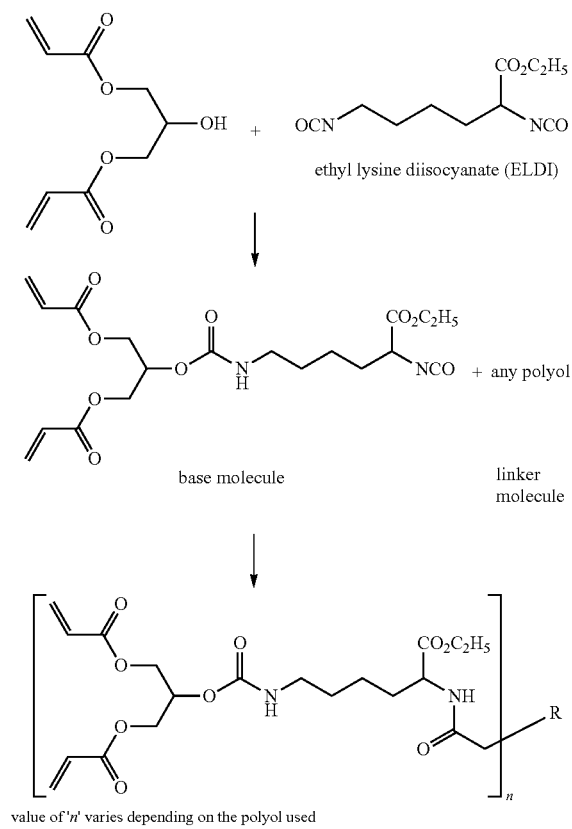

value of 'n' varies depending on the polyol used

In this case any polyol or an amino functional molecule having an appropriate molecular weight in the range 200 to about 2000 and any architecture, linear or branched, can be used as the linker in the composition.

In the above examples, generally a molar ratio of 4:1 of linker: base molecule is present. Water may be a dispersant in the above preferred embodiments. Preferably up to 40% water by weight may be mixed to achieve a stable emulsion like mixture. In such cases the residual isocyanate groups react with water to produce carbon dioxide and function as a blowing agent to create porosity. Consequent generation of amino groups enhances the hydrophilicity of the surface of the cured polymer. A surfactant may also be added to the compositions to control the pore size and distribution Further increases in hydrophilicity may be achieved by the inclusion of radically polymerizable monomers as additional components in the composition, capable of acting as compatibilizers which alters the hydrophilicity/hydrophobicity ratio thereby adjusting the polymer composition to the environment of use.

Another alternative preferred embodiment is based on a base molecule made from pentaerythritol triacrylate and ethyl lysine diisocyanate with the linker being a polyol.

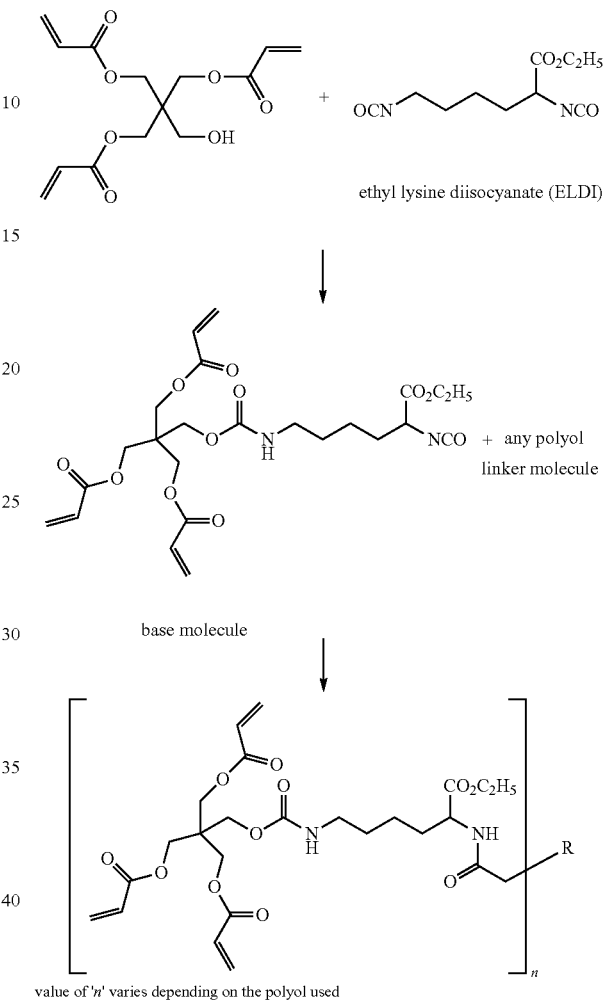

value of 'n' varies depending on the polyol used

In this case any polyol or an amino functional molecule having an appropriate molecular weight in the range 200 to about 2000 and any architecture, linear or branched, can be used as the linker in the composition.

In another preferred embodiment dual cure polymer compositions may also be prepared using caprolactone triol as linker, and an oligomer of methyl lysine diisocyanate, and isocyanatoethylmethacrylate as base:

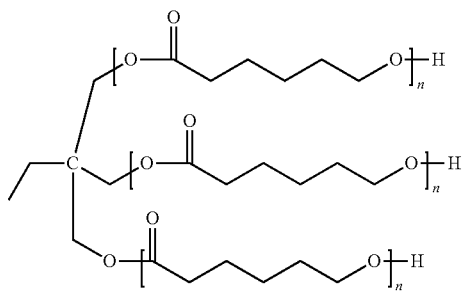

-continued

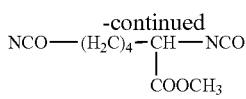

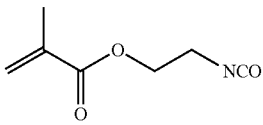

↓

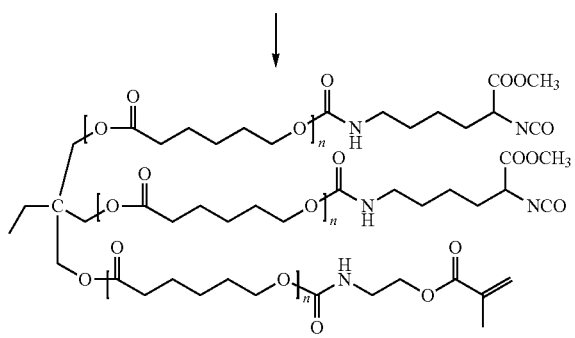

The compositions illustrated above can be cured by conventional photolytic or radiation triggered initiators and matching monochromatic light of any radiation frequency. Any initiator compound or compounds which will form initiator radicals so as to effect free radical polymerization are suitable. For biomedical applications visible light is preferred. For the above examples, curing can be achieved with camphorquinone together with a tertiary amine (e.g. dimethyl aminoethyl acrylate), and visible light centred approximately at 450 nm. Complete curing can be achieved within very short periods of time, depending on the levels of the initiator. With 0.1% of initiator a 20-60 second burst of blue light at 1000 mW/cm$^2$ is sufficient for complete cure.

The ratio of base to linker molecule can be varied to alter the properties of the cured material. For example, using a linker that is considered to be soft, such as poly(caprolactone diol) in excess with less cross linking enables the final material to be softer with high elongation. Alternatively increased cross linking allows the preparation of harder material with less elongation.

The following examples are intended to illustrate the scope of the invention and to enable reproduction and comparison. They are not intended to limit the scope of the disclosure in any way.

EXAMPLES

The following examples illustrate the preparation of prepolymer compositions for suitable second and further curing stages. Examples 1-5 illustrate the preparation of linker molecules for use in the composition of the invention.

Example 1

Materials: Polycaprolactone diol (PCLD 400) with molecular weight Mn 400 (Era Polymers or Aldrich) was pre-dried to eliminate any residual water at 90° C. under vacuum (40 mm Hg) for at least 2 hours prior to use. Ethyl 2,6-diisocyanato hexanoate (ELDI) (Kyowa Hakko Kogyo Co. Ltd) was used as received from supplier.

Procedure: Pre-dried PCL400 (6.0 g, 15 mmoL) was weighed in to a round bottom flask equipped with a magnetic stirrer, a nitrogen inlet and a drying tube. ELDI (8.48 g, 37.5 mmoL) was added to the flask while stirring and heated at 70° C. for two hours under nitrogen. The heating bath was removed and the mixture was stirred over night at room temperature. The resultant product was degassed and stored under a nitrogen atmosphere in the freezer. Stannous 2-ethyl hexanoate (0.1% of total mass) may be employed as a catalyst to accelerate the reaction.

Example 2

Materials: Polycaprolactone diol (PCLD1000) with molecular weight Mn 1000 (Era Polymers or Aldrich) was pre-dried to eliminate any residual water at 90° C. under vacuum (40 mm Hg) for at least 2 hours prior to use. Ethyl 2,6-diisocyanto hexanoate (ELDI) (Kyowa Hakko Kogyo Co. Ltd) was used as received from supplier.

Procedure: PCL1000 (15.00 g, 15 mmoL) pre-dried as described above was weighed in to a round bottom flask equipped with a magnetic stirrer, a nitrogen inlet and a drying tube. Ethyl 2,6-diisocyanato hexanoate (8.48 g, 37.50 mmoL) was rapidly added to the diol while with rapid stirring at 40° C. and heated at 70° C. for two hours. The heating bath was removed and the mixture was stirred over night at room temperature under a nitrogen atmosphere. The mixture thickened on reaction between the diol and the diisocyanate. The mixture was degassed and stored over nitrogen in the freezer. Stannous 2-ethyl hexanoate (0.1% of total mass) may be employed as a catalyst to accelerate the reaction.

Example 3

Materials: Polycaprolactone diol (PCLD2000) with molecular weight Mn 2000 (Era Polymers or Aldrich) was pre-dried to eliminate any residual water at 90° C. under vacuum (40 mm Hg) for at least 2 hours prior to use. Ethyl 2,6-diisocyanato hexanoate (ELDI) (Kyowa Hakko Kogyo Co. Ltd) was used as received from supplier.

Procedure: PCL2000 (7.50 g, 3.75 mmoL) pre-dried as described above was weighed in to a round bottom flask equipped with a magnetic stirrer, a nitrogen inlet and a drying tube. Ethyl 2,6-diisocyanato hexanoate (2.11 g, 9.38 mmoL) was rapidly added to the diol while with rapid stirring at 40° C. and heated at 70° C. for two hours. The heating bath was removed and the mixture was stirred over night at room temperature under a nitrogen atmosphere. The mixture thickened on reaction between the diol and the diisocyanate. The mixture was degassed and stored over nitrogen in the freezer. At ambient temperature the mixture is a solid, however, melts at 70° C.

Example 4

Materials: Poly(lactic acid) diol (PLA400) with molecular weight Mn 417 was pre-dried to eliminate any residual water at 90° C. under vacuum (40 mm Hg) for at least 2 hours prior to use. Ethyl 2,6-diisocyanto hexanoate (ELDI) (Kyowa Hakko Kogyo Co. Ltd) was used as received from supplier.

Procedure: PLA400 (3.12 g, 7.5 mmoL) pre-dried as described above was weighed in to a round bottom flask equipped with a magnetic stirrer, a nitrogen inlet and a drying tube. Ethyl 2,6-diisocyanato hexanoate (4.24 g, 18.75 mmoL) was rapidly added to the diol while with rapid stirring at 40° C. and heated at 70° C. for two hours. The heating bath was removed and the mixture was stirred over night at room temperature under a nitrogen atmosphere. The mixture thickened on reaction between the diol and the diisocyanate, was degassed and stored over nitrogen in the freezer. Dibutyl tin octonoate (0.1% of total mass) may be employed as a catalyst to accelerate the reaction.

Example 5

Materials: Polytetramethylene ether glycol (PTMEG1000) with molecular weight Mn 1000 (Aldrich) was pre-dried to eliminate any residual water at 90° C. under vacuum (40 mm Hg) for at least 2 hours prior to use. 4,4'-methylenediphenyl diisocyanate (MDI) (Aldrich) was used as received from supplier.

Procedure: PTMEG1000 (10.35 g, 10.30 mmoL) pre-dried as described above was weighed in to a round bottom flask equipped with a magnetic stirrer, a nitrogen inlet and a drying tube. MDI (6.52 g, 26 mmoL) was rapidly added to the diol while with rapid stirring at 80° C. and heated at 80° C. for two hours. The heating bath was removed and the mixture was stirred over night at room temperature under a nitrogen atmosphere. The mixture thickened on reaction between the diol and the diisocyanate, was degassed and stored over nitrogen in the freezer. This procedure was adopted from the technical bulletin of "DuPont Terathane", available from the web.

Examples 6-9 illustrate the preparation of prepolymer for use as a base molecule according to the invention.

Example 6

Molar ratio; NCO:Acrylate (2:1)

Materials: Polycaprolactone triol (MW 300, Aldrich) was dried under vacuum (0.1 torr) at 80° C. over night. Methyl 2,6-diisocyanato hexanoate (MLDI, Kyowa Yuka Co., Ltd, Japan) and Isocyanatoethyl methacrylate and 2,6-di-tert-butyl-4-methylphenol were used as received. All the glassware used was thoroughly cleaned and dried at 105° C. overnight in an oven before use.

Procedure: Predried polycaprolactone triol (4.0 g) was weighed in a dry three-neck flask equipped with a magnetic stirrer, nitrogen inlet and drying tube. Methyl 2,6-diisocyanato hexanoate (MLDI) (5.65 g) was then added to the flask followed by isocyanatoethyl methacrylate (IEM) (2.06 g) followed by 2,6-di-tert-butyl-4-methylphenol (0.002 g, 0.1 wt % of IEM) under nitrogen. The reaction mixture was stirred and heated in the dark to 70° C. for 2 h under nitrogen atmosphere. The homogenous polymer mixture was degassed under vacuum (0.1 torr) at 50° C. before it was transferred to a vial under nitrogen atmosphere and stored in the refrigerator. The molecular weight and viscosity of the prepolymer were determined by gel permeation chromatography (GPC) and showed number average molecular weight and polydispersity 2116 and 1.21, respectively.

GPC was performed on Water Associates Liquid Chromatograph system (Waters 717) equipped with a differential refractometer and four μ-Styragel columns ($10^5$, $10^4$, $10^3$ and 100 Å). The mobile phase was tetrahydrofuran (THF) at a flow rate of 1 mL/min. Prepolymer was dissolved in THF by warming the solution at 50° C. for 1 h and filtered through 0.45 micron filter before analysis. The system was calibrated with narrow disperse polystyrene standards and molecular weights are reported as polystyrene equivalents. The viscosity was measured using Bohlin Rheometer (CSR10) at 23° C.

Example 7

Molar ratio; NCO:Acrylate (2.5:0.5)

Materials: Polycaprolactone triol (MW 300, Aldrich) was dried under vacuum (0.1 torr) at 80° C. over night. Methyl 2,6-diisocyanato hexanoate (MLDI, Kyowa Yuka Co., Ltd, Japan) and isocyanatoethyl methacrylate and 2,6-di-tert-butyl-4-methylphenol were used as received. All the glassware used was thoroughly cleaned and dried at 105° C. overnight in an oven before use.

Procedure: Predried polycaprolactone triol (4.0 g) was weighed in a dry three-neck flask equipped with a magnetic stirrer, nitrogen inlet and drying tube. Methyl 2,6-diisocyanato hexanoate (MLDI) (7.07 g) was then added to the flask followed by isocyanatoethyl methacrylate (IEM) (1.03 g) followed by 2,6-di-tert-butyl-4-methylphenol (0.001 g, 0.1 wt % of IEM) under nitrogen. The reaction mixture was stirred and heated in the dark to 70° C. for 2 h under nitrogen atmosphere. The homogenous polymer mixture was degassed under vacuum (0.1 torr) at 50° C. before it was transferred to a vial under nitrogen atmosphere and stored in the refrigerator.

Example 8

Preparation of prepolymer with initiater 2-hydroxy-1-[4-(hydroxyethoxy)phenyl]-2-methyl-1-propanone (Irgacure 2959) covalently attached to a base prepolymer.

Molar ratio: NCO:Acrylate: (1.8:1.0)

Materials: Polycaprolactone triol (MW 300, Aldrich) was dried under vacuum (0.1 torr) at 80° C. over night. Methyl 2,6-diisocyanato hexanoate (MLDI, Kyowa Yuka Co., Ltd, Japan) and isocyanatoethyl methacrylate and 2,6-di-tert-butyl-4-methylphenol (Aldrich) and Irgacure 2959 (Ciba) were used as received. All the glassware used was thoroughly cleaned and dried at 105° C. overnight in an oven before use.

Procedure: Predried polycaprolactone triol (5.0 g) was weighed in a dry three-neck flask equipped with a magnetic stirrer, nitrogen inlet and drying tube. Methyl 2,6-diisocyanato hexanoate (MLDI) (6.36 g) was then added to the flask followed by isocyanatoethyl methacrylate (IEM) (2.56 g) followed by 2,6-di-tert-butyl-4-methylphenol (0.002 g, 0.1 wt % of IEM) and lrgacure2959 (0.786 g) under nitrogen. The reaction mixture was stirred and heated in the dark to 70° C. for 2-2.5 h under nitrogen atmosphere. The homogenous polymer mixture was degassed under vacuum (0.1 torr) at 50° C. before it was transferred to a vial under nitrogen atmosphere and stored in the refrigerator.

Example 9

Preparation of a Glycerol based prepolymer NCO:Acrylate (1:3)

Materials: Glycerol (Aldrich) was dried under vacuum (0.1 torr) at 80° C. over night. Methyl 2,6-diisocyanato hexanoate (MLDI, Kyowa Yuka Co., Ltd, Japan) and Isocyanatoethyl methacrylate and 2,6-di-tert-butyl-4-methylphenol were used as received. All the glassware used was thoroughly cleaned and dried at 105° C. overnight in an oven before use.

Procedure: Glycerol (2.50 g) was weighed in a dry three-neck flask equipped with a magnetic stirrer, nitrogen inlet and drying tube. Isocyanatoethyl methacrylate (IEM) (12.6 g) was then added to the flask followed by 2,6-di-tert-butyl-4-methylphenol (0.0012 g, 0.1 wt % of IEM) under nitrogen. The reaction mixture was stirred and heated in dark to 70° C. for 22 h under nitrogen atmosphere. The homogenous mixture was degassed under vacuum (0.1 torr) at 70° C. before it was transferred to a vial under nitrogen atmosphere and stored in the refrigerator. The number average molecular weight and polydispersity of the prepolymer were 607 and 1.02, respectively based on GPC analysis.

Examples 10 to 17, except example 15, illustrate photocuring of prepolymer using either visible or UV light. Following is a brief description of the procedure used.

For visible light curing the light source used was supplied by 3M industries. The model used was ESPE Elipar Freelight 2, which emits in the range of 430-480 nm and at an intensity of 1000 mW/cm$^2$. The experiments conducted in Teflon wells, curing from one side.

Procedure: The degassed pre-polymer was weighed in to a glass sample vial. Camphorquinone (0.1%) and N,N dimethyl amino ethyl methacrylate (DMAEMA) (0.2%) (or any other sensitizer) was added, mixed with the pre-polymer. Water (with or without gelatin beads) is added (if desired) up to 40% of the mass, mixed to a creamy consistency and the mixture taken up in a syringe. The composition with camphorquinone needs to be kept in a dark environment as natural light triggers the curing process. The polymer mixture is poured in to a cylindrical Teflon cavity and irradiated using the blue lamp for 1-2 minutes, during which time the curing occurs. The solid plug can be removed immediately from the mould as 1-2 minutes curing turns it in to a hard solid.

Example 10

Degassed prepolymer (1.00 g) of Polycaprolactone triol with MLDI prepared in Example 1 was weighed in to a cavity (20×20×10 mm) made in a Teflon block. Degassed and dried polycaprolactone triol of molecular weight (MW 300, 0.1819 g), camphorquinone (0.1 wt % 0.0018 g) and N,N dimethyl amino ethyl methacrylate (DMAEMA) (0.003 g) was mixed together and added to the prepolymer. The mixture was stirred for several minutes in dark and then gelatin beads (10-50% by weight) was added and stirred further for 5 min. The mixture which was a viscous and injectable liquid, was taken into a 2.5 ml syringe and dispensed 0.29 g into each cylindrical cavity (6 mm D×12 mm L) in a multi-cavity Teflon mould, sealed and cured for 10 sec with blue light (430-460 nm) to give porous cylindrical polymer test specimens.

The following examples illustrate UV (photo)curing.

Example 11

Tagged UV initiator (Irgacure 2959)

Degassed prepolymer (0.35 g) of PCLT and IEM and MLDI prepared in Example 8 was weighed in a polypropylene mould. N,N-dimethyl amino ethyl methacrylate (DMAEMA) (0.015 g) and gelatine beads (0.1 g) was added to the prepolymer. The mixture was mixed well for few minutes and then cured with UV light (365 nm, 1 MW/cm2@8 cm, Spectraline) to give a porous polymer test specimens.

Example 12

Glycerol dimethacrylate (91 mg, 0.40 mmoL) was mixed with the composition made in example 5 (100 mg, 0.10 mmoL) and 1 mg of stannous-2-ethylhexanoate in a glass vial. The mixture was allowed to stand under nitrogen for 4 hours in the dark and CIBA UV initiator Darocur (5 mg) added. The mixture was placed under a UV lamp (365 nm, 1 MW/cm2@8 cm, Spectraline) for 1 hour at which time the mixture hardened to a solid, with good adhesion to glass. A control experiment without a radical initiator remained non-cross linked.

Example 13

Glycerol dimethacrylate (45.60 mg, 0.20 mmoL) was mixed with the composition of example 1 (170 mg, 0.20 mmoL) and 0.5 mg of CIBA UV initiator Darocur in a glass vial. The mixture was allowed to stand under nitrogen for 4 hours in the dark and exposed to UV light (365 nm, 1 MW/cm2@8 cm, Spectraline) for 1 hour at which time the mixture cured to a hard solid, with good adhesion to glass. A control experiment without a radical initiator remained non-cross linked.

The following example illustrates the use of water to create a porous material

Example 14

Glycerol dimethacrylate (45.60 mg, 0.20 mmoL) was mixed with a prepolymer according to example 1 (170 mg, 0.20 mmoL) and 0.5 mg of CIBA UV initiator Darocur in a glass vial. The mixture was allowed to stand under nitrogen for 4 hours in the dark and 100 mg of water added. The mixture was mixed to a creamy composition and exposed to UV light (365 nm, 1 MW/cm2@8 cm, Spectraline) for 1 hour at which time the mixture cured to a hard porus solid. A control experiment without a radical initiator remained non-cross linked.

The following example illustrates the use of a redox initiator in the second curing step.

Example 15

Degassed prepolymer (0.02 g) prepared in Example 9 was weighed in to a cavity (20×20×10 mm) made in a Teflon block. A solution of Ammonium per sulfate (0.04 g/ml) (20 micro liter) and Sodium metabisulfite (0.04 g/ml) (20 micro liter) and N,N,N,N tetramethylethylenediamine (sensitizer) 0.1 wt % were added to the prepolymer. The mixture was stirred for several minutes and dispensed 0.29 g into each cylindrical cavity (6 mm D×12 mm L) in a cavity Teflon mould covered with glass plate and cured at 37° C. to give porous cylindrical polymer test specimens.

Example 16

Degassed prepolymer (1.00 g) of Polycaprolactone triol with MLDI prepared in Example 6 was weighed in to a cavity (20×20×10 mm) made in a Teflon block. Degassed and dried polycaprolactone triol of molecular weight (MW 300, 0.1819 g), initiator camphorquinone (0.1 wt % 0.0018 g) and N,N'-dimethyl amino ethyl methacrylate (DMAEMA) (0.003 g) was mixed together and added to the prepolymer. The mixture was stirred for several minutes in the dark and then gelatine beads (10-50% by weight) was added and stirred further for 5 min. The mixture which was a viscous and injectable liquid, was taken into a 2.5 ml syringe and dispensed 0.29 g into each cylindrical cavity (6 mm D×12 mm L) in a multi-cavity Teflon mould, sealed and cured for 10 sec with blue light (430-460 nm) to give porous cylindrical polymer test specimens.

The prepolymer prepared above was also cured with UV light (365 nm) using UV initiator Irgacure 2959 to give a porous polymer test specimens.

Example 17

ELDI (40.14 g) was added to four arm poly(D/L-lactic acid) (39.47 g, Mn 889) in a round bottom flask. Stannous 2-ethyl hexanoate (40 mg, 0.05%) was added and the mixture allowed to stir for 12 hours.

Part of the above reaction mixture (24.96 g) was placed in a round bottom flask, pentaerythritol triacrylate (16.6 g) and MEHQ (32.5 mg) added. The mixture (prepolymer) was allowed to stir for 12 hours before use.

No filler: The pre-polymer (6.040 g) was weighed in to small beaker and mixed to a creamy consistency before CQ (20 mg) and DMAEMA (40 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The mechanical properties of the resultant structure are described in Table 3.

TCP-20: The pre-polymer (5.478 g) and β-tricalcium phosphate (TCP) (1.096 g) was weighed in to small beaker and mixed to a creamy consistency before CQ (19.7 mg) and DMAEMA (40 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The sample specimens were conditioned at ambient temperature for 10 days before testing for mechanical properties, the details of which are provided in Table 3.

HA-20: The pre-polymer (5.731 g) and hydroxy apatite (1.146 g) was weighed in to small beaker and mixed to a creamy consistency before CQ (20 mg) and DMAEMA (40 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The mechanical properties of the resultant structure are described in Table 3.

Example 18

ELDI (20.85 g) was added to four arm poly(D/L-lactic acid) (20.85 g, Mn 889) in a round bottom flask. The mixture allowed to stir for 12 hours. Part of the above reaction mixture (10.76 g) was placed in a round bottom flask, Glycerol diacrylate (5.47 g) and BHT (38 mg) added. The mixture was allowed to stir for 12 hours before use.

No filler: The pre-polymer (4.40 g) was weighed in to small beaker and mixed to a creamy consistency before CQ (4.4 mg) and DMAEMA (20 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The mechanical properties of the resultant sample are described in Table 3.

HA-10: The pre-polymer (4.40 g) and hydroxy apatite (0.44 g) was weighed in to small beaker and mixed to a creamy consistency before CQ (5 mg) and DMAEMA (10 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The resultant samples' mechanical properties are described in Table 3.

Example 19

ELDI (4.52 g) was added to a solution of four arm-poly(D/L-lactic acid-co-glycolic acid) (20 g, Mn 4000) in dichloromethane (20 mL). The mixture allowed to stir for 12 hours.

Glycerol diacrylate (4.56 g) in dichloromethane (5 mL) and BHT (35 mg) added. The mixture was allowed to stir for 12 hours and the solvent removed under high vacuum before use.

No filler: The pre-polymer (3.34 g) was weighed in to small beaker and mixed to a creamy consistency before CQ (10 mg) and DMAEMA (100 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The mechanical properties of the resultant structure are described in Table 3.

Example 20

ELDI (4.70 g) was added to a solution of four arm-poly(D/L-lactic acid-co-glycolic acid, 3:1) (6.18 g, Mn 1228) in dichloromethane (2 mL). The mixture allowed to stir for 12 hours.

Pentaerythritol triacrylate (5.98 g) and BHT (6 mg) added. The mixture was allowed to stir for 12 hours and the solvent reduced under high vacuum before use.

TCP-20: The pre-polymer (5.079 g) and β-tricalcium phosphate (TCP) (1.015 g) was weighed in to small beaker and mixed to a creamy consistency before CQ (~15 mg) and DMAEMA (~30 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The sample specimens were conditioned at ambient temperature for 7 days before testing for mechanical properties. The mechanical properties are described in Table 3.

Example 21

ELDI (4.74 g) was added to a solution of four arm-poly(D/L-lactic acid-co-glycolic acid) (6.576 g, Mn 1228) in dichloromethane (2 mL). The mixture allowed to stir for 12 hours.

Pentaerythritol triacrylate (6.20 g) and BHT (6 mg) added. The mixture was allowed to stir for 12 hours and the solvent reduced under high vacuum before use.

TCP-20: The pre-polymer (5.043 g) and β-tricalcium phosphate (TCP) (1.008 g) was weighed in to small beaker and mixed to a creamy consistency before CO (~15 mg) and DMAEMA (~30 mg) was added. The mixtures were degassed for a brief period under moderate vacuum (70 mmHg) to remove any air bubbles and samples placed in 6 mm×12 mm well plates made of Teflon. Two glass plates were placed on either side of the Teflon block, clamped and the polymer samples in the wells irradiated with blue light for 2-3 minutes. Upon completion of irradiation the samples were left in the mould for 24 hours. Removed the samples from the mould and further cured using blue light to ensure complete curing. The sample specimens were conditioned at ambient temperature for 7 days before testing for mechanical properties. The mechanical properties are described in Table 3.

TABLE 3

Mechanical properties of polymer compositions prepared according to examples 17-21

| Sample code | Ultimate Compression Strength (MPa) | Compression Strength @ Yield Point (MPa) | Compression Modulus (GPa) | Formulation/ comments |
|---|---|---|---|---|
| Example 17 No Filler | 60 ± 10 | 32 ± 1 | 0.9 ± 0.2 | PLA (900), PETA/No filler |
| Example 17 TCP-20 | 65 ± 10 | 55 ± 10 | 2.1 ± 0.5 | PLA (900), PETA, TCP (20%) |
| Example 17 HA-20 | 61 ± 9 | 32 ± 5 | 1.1 ± 0.1 | PLA (900), PETA, HA (20%) |
| Example 18 No Filler | 38 ± 10 | 33 ± 7 | 1.1 ± 0.3 | PLA (900), GDA, no filler |
| Example 18 HA-10 | 44 ± 8 | 43 ± 6 | 1.3 ± 0.3 | PLA(900), GDA, HA (10%) |
| Example 19 No Filler | — | 59 ± 3 | 26 ± 2 (MPa) | P[LA-GA, 3:1](4000), GDA |
| Example 20 TCP-20 | 83 ± 10 | 32 ± 8 | 1.8 ± 0.3 | P(LA:GA, 3:1] (1228); PETA, TCP(20%) |
| Example 21 TCP-20 | 76.0 ± 0.2 | 32 ± 6 | 1.6 ± 0.1 | P(LA:GA, 1:1] (1228); PETA, TCP (20%) |

Example 22

The present example illustrates the biocompatibility and biodegradability of the polymer compositions according to the invention.

Preparation of polymer: ELDI (12.43 g) was added to linear poly(glycolic acid) (10.3 g, Mn 411) in a round bottom flask. Stannous 2-ethyl hexanoate (22 mg, 0.1%) was added and the mixture allowed to stir for 24 hours.

Part of the above reaction mixture (10.37 g) was placed in a beaker, Glycerol diacrylate (1.37 g), camphoquinone (23.5 mg, 0.2%), DMAEMA (47 mg, 0.4%) an gelatine beads dispersed in water (2.4 g, 20%) added. and BHT (38 mg) added. The compositin was mixed thoroughly before cured. Samples were placed in 6 mm (D)×12 mm (H) well plates made of Teflon, glass plates placed on either side, clamped and the samples irradiated with blue light for 2-3 minutes. Upon completion of irradiation the samples were left in the mould for 24 hours.

Removed the samples from the mould and further cured using blue light to ensure complete curing.

Implantation Procedure and results: The in vivo biocompatibility and biodegradation of preformed polymers were conducted using standard methods in female rats. The procedure is as follows: Eight week old, female, Sprague Dawley rats were anaesthetised using a ketamine/xylazine mixture. Once anaesthetised a subcutaneous pocket was created in the back of the rat. Two 6 mm D×10 mm H sterile preformed polymers were inserted into the pocket, one to the left and the other to the right of the initial incision. Once in place the wound was closed with a 9 mm wound clip. Animals were monitored every 2 hrs for the first 6 hours and every 12 hours for the first 3 days. Intensive monitoring was undertaken every 2 weeks, which included weighing the animals, visual monitoring of the surgical site, and measuring of the polymers with digital callipers (length and width) to assess degradation.

At set time points the animals were killed with Nembutal (sodium pentobarbitone), serum was collected, polymer with surrounding tissue was excised. The polymer was fixed in formalin and processed for histological analysis. All major organs prior to removal were assessed for signs of gross pathology. Once removed, these organs were weighed and then pieces processed for histology.

After 1 and 3 months in vivo all rats showed no signs of disease, all gained weight similar to the controls and there was no swelling or adverse reactions to the presence of the polymers. No gross pathology was seen in any major organ. After 4 months a small soft capsule had formed around the polymers. No calcification was noted. Analysis of Haematoxylin and Eosin stained sections at 1 and 3 months revealed a normal looking dermis. Occasional neutrophils were noted however there presence was due to mechanical shearing induced by some movement of polymer.

Example 23

Figure 1:
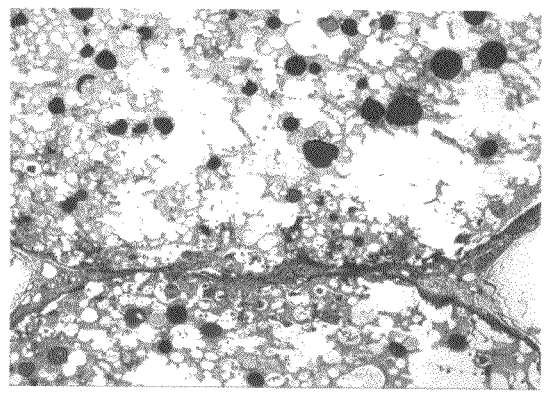
FIGS. 1, 2 and 3 show representative micrographs of explants after one, three and six months, respectively showing cell infiltration and polymer break down.
Figure 1:
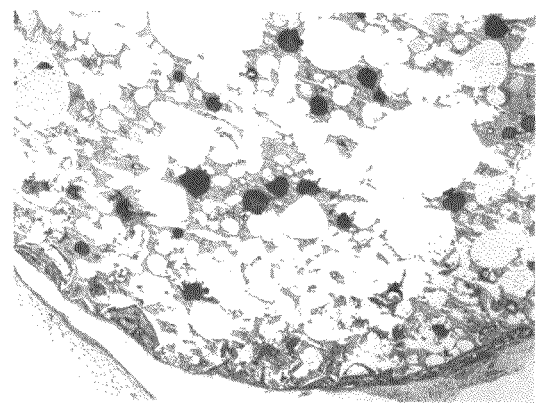
Figure 2:
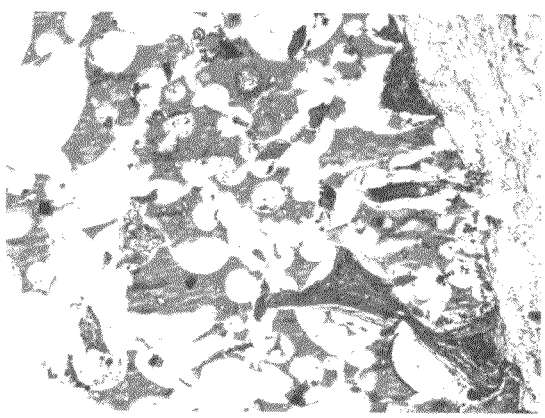
Figure 2:
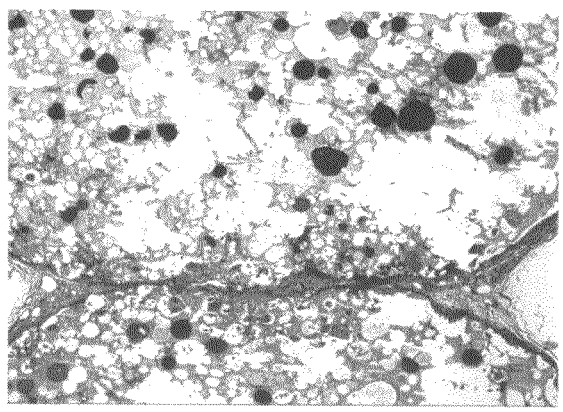
Figure 3:
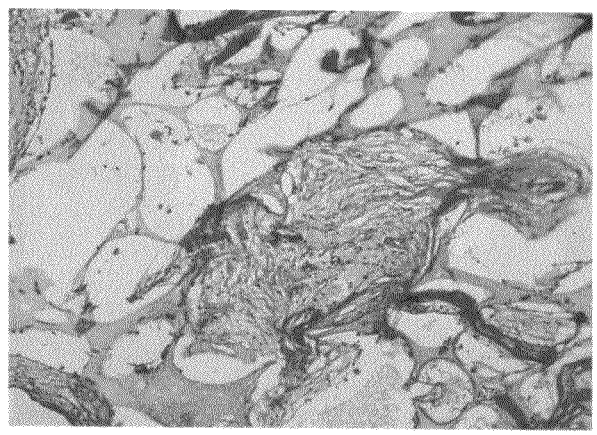
Figure 3:
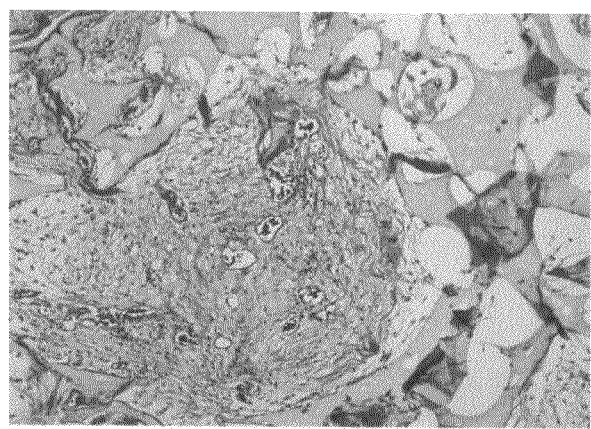

The use of sulphur analogs of methyl or ethyl lysine diisocyanate in place of or in addition to any other isocyanates described herein is expected to result in polymer compositions in accordance with the examples described above. Possible analogs are:

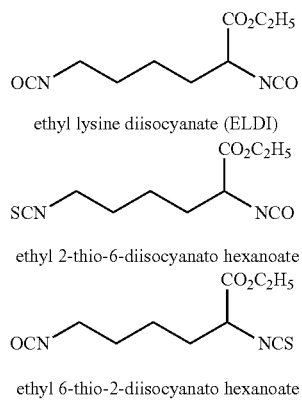

ethyl lysine diisocyanate (ELDI)

ethyl 2-thio-6-diisocyanato hexanoate ethyl 6-thio-2-diisocyanato hexanoate

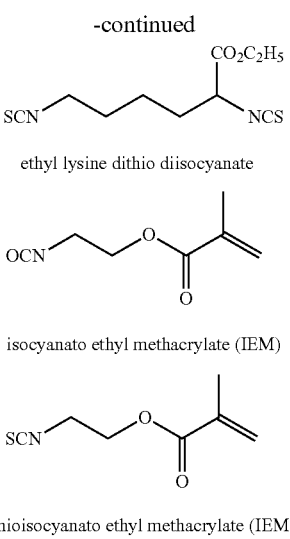

ethyl lysine dithio diisocyanate isocyanato ethyl methacrylate (IEM)

thioisocyanato ethyl methacrylate (IEM)

For example, pentaerythritol triacrylate when added to ethyl lysine dithio diioscyanate, is expected to result in the thio variant of the base molecule below. Upon addition of this base molecule to any linker polyol, the link is expected to result in thiourethane functionality.

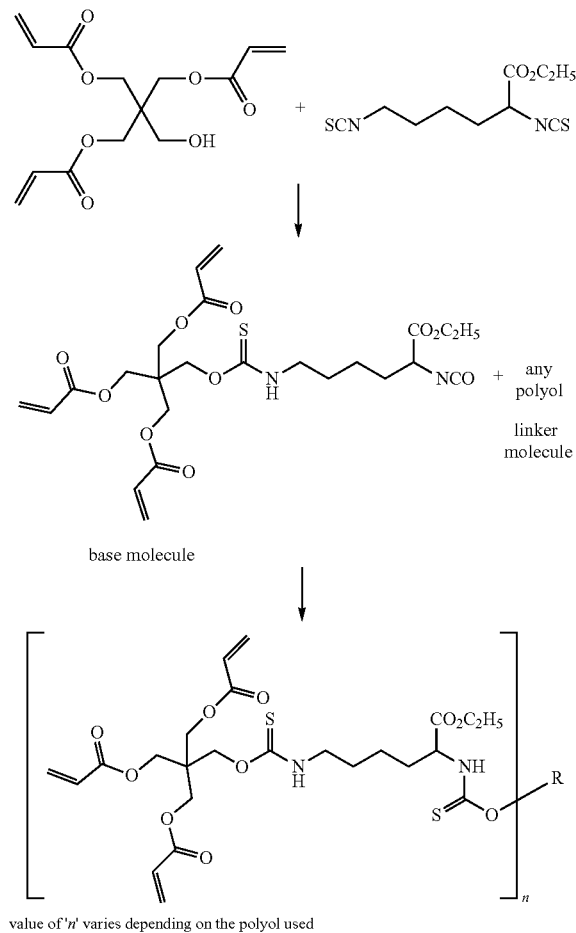

value of 'n' varies depending on the polyol used

The prepolymers designed are biodegradable to products that are bio resorbable or biocompatible low molecular weight compounds easily removed through body's waste disposal pathways.

The compositions of the invention in their most preferred embodiment use free radical polymerisation of ethylenically unsaturated end groups attached to the prepolymers to form a cross linked network. Porus and non-porus polymers have been formed following the application of electromagnetic radiation in both visible (blue light~440 nm) and UV regions, for short periods. The non-cross linked prepolymers prepared are low molecular weight liquids, injectable through an 18 gauge needle and may be cross linked on demand under wet conditions. It will be appreciated that the biocompatible prepolymer, polymer and cured polymeric end products of the invention provide unique advantages in biomedical applications by virtue of their dual or multi staged curing and by virtue of their manipulability throughout the process of their preparation. It will also be appreciated that the invention is not limited to the specific examples provided, but that other biocompatible prepolymers, polymers and cured end products can be made which fall within the spirit of this invention without being specifically illustrated herein.

The invention claimed is:

1. A biocompatible, biodegradable prepolymer for use in biomedical applications comprising the reaction product of:
   (a) a base molecule having a molecular weight of 155 or less and having at least two differing functionalities; wherein at least one of the functionalities is acrylate and the at least one other functionality is one or more isocyanate groups;
   (b) a linker molecule having a molecular weight of 300 or less and having a functionality reactive with at least one of said functionalities of said base molecule;
   said reaction product being the result of a first curing stage wherein the first of said at least two functionalities of said base molecule reacts with the functionality of said linker molecule to form said prepolymer, and wherein said prepolymer flows and is injectable.

2. A biocompatible, biodegradable polymer composition for use in biomedical applications comprising the reaction product of claim 1 having the second and any further functionality of said base molecule activated by at least one initiator compound in a second and optionally further curing stage.

3. The biocompatible, biodegradable polymer composition according to claim 2, additionally comprising one or more of the group consisting of radical inhibitor, sensitizer, promoter, dispersant, porogen, catalyst, biological components, bioactive molecules, hydroxyapatite, calcium phosphate, and surfactant.

4. A cured biocompatible, biodegradable polymeric end product for use in biomedical applications comprising the reaction product of:
   (a) a base molecule having a molecular weight of 155 or less and having at least two differing functionalities; wherein at least one of the functionalities is acrylate and the at least one other functionality is one or more isocyanate groups;
   (b) a linker molecule having a molecular weight of 300 or less and having a functionality reactive with at least one of said functionalities of said base molecule;
   (c) at least one initiator compound;
   said end product being the result of a first curing stage wherein the first of said at least two functionalities of said base molecule reacts with the functionality of said linker molecule to form the prepolymer according to claim 1, and a second curing stage and optionally further curing stages wherein said initiator compound is activated to affect free radical polymerization of at least said second functionality of said base molecule.

5. An article of manufacture comprising the biocompatible, biodegradable polymer composition according to claim 2.

6. The article of claim 5 wherein the article is a biomedical implant, a bioadhesive, a dental or periodontal cement composition, a dry delivery vehicle composition, or an aqueous emulsion for the delivery of cells, growth factors or bioactive moieties including biopharmaceuticals and drugs.

7. An article of manufacture comprising the biocompatible, biodegradable prepolymer according to claim 1.

8. The article of claim 7 wherein the article is a biomedical implant, a bioadhesive, a dental or periodontal cement composition, a dry delivery vehicle composition, or an aqueous emulsion for the delivery of cells, growth factors or bioactive moieties including biopharmaceuticals and drugs.

9. An article of manufacture comprising the cured biocompatible biodegradable prepolymer composition according to claim 4.

10. The article of claim 9 wherein the article is a biomedical implant, a bioadhesive, a dental or periodontal cement composition, or a dry delivery vehicle composition.

11. The biocompatible, biodegradable prepolymer according to claim 1, wherein the base molecule is isocyanato ethyl methacrylate or isocyanato ethyl acrylate.

12. The biocompatible, biodegradable polymer composition according to claim 2, wherein the base molecule is isocyanato ethyl methacrylate or isocyanato ethyl acrylate.

13. The cured biocompatible, biodegradable polymeric end product according to claim 4, wherein the base molecule is isocyanato ethyl methacrylate or isocyanato ethyl acrylate.

* * * * *